United States Patent Office 2,812,672
Patented Nov. 12, 1957

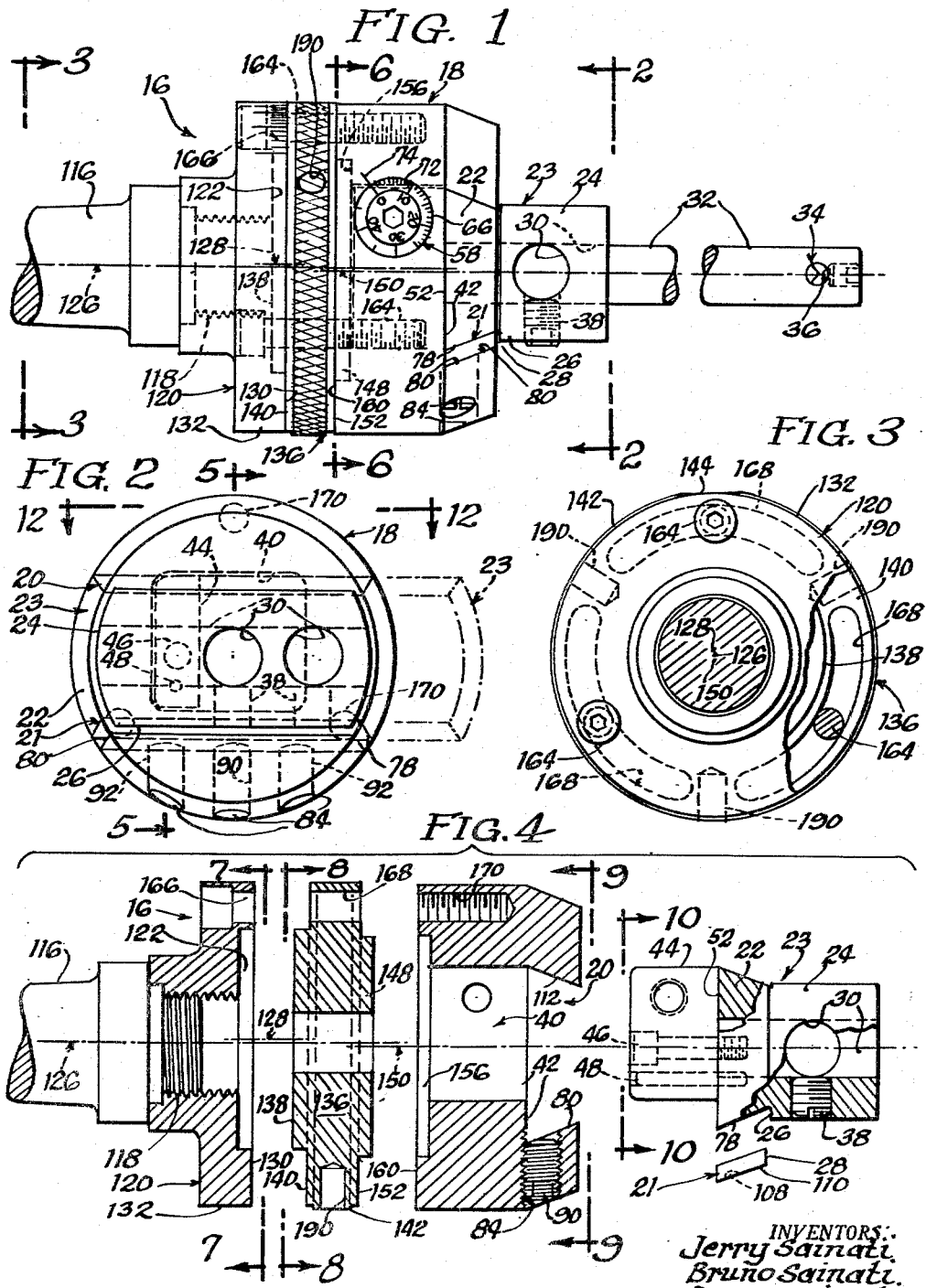
Nov. 12, 1957  J. SAINATI ET AL  2,812,672
ADJUSTMENT HEAD FOR BORING BARS
Filed April 23, 1954  3 Sheets-Sheet 1
INVENTORS:
Jerry Sainati
Bruno Sainati
Leo Sainati Nov. 12, 1957    J. SAINATI ET AL    2,812,672
ADJUSTMENT HEAD FOR BORING BARS
Filed April 23, 1954    3 Sheets-Sheet 2
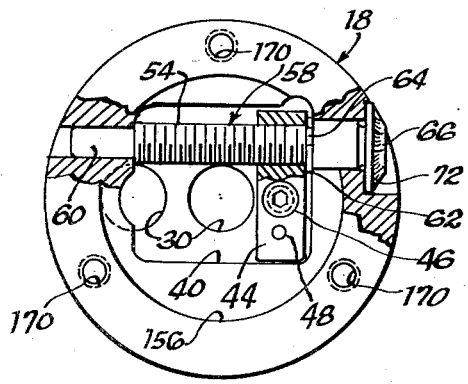
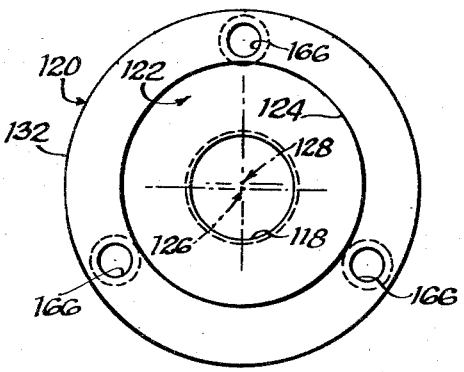
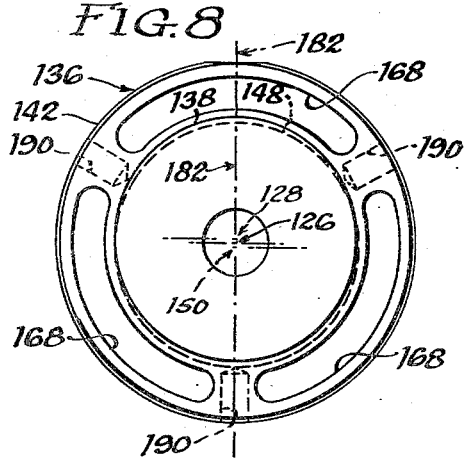
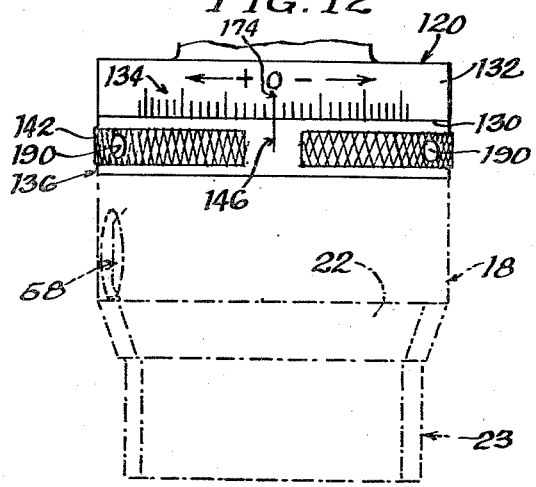
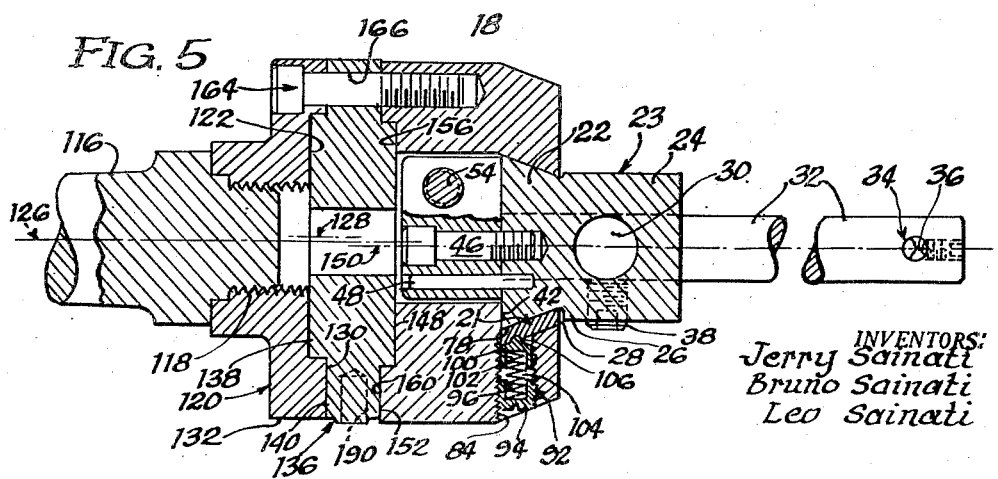
INVENTORS:
Jerry Sainati
Bruno Sainati
Leo Sainati Nov. 12, 1957   J. SAINATI ET AL   2,812,672
ADJUSTMENT HEAD FOR BORING BARS
Filed April 23, 1954   3 Sheets-Sheet 3
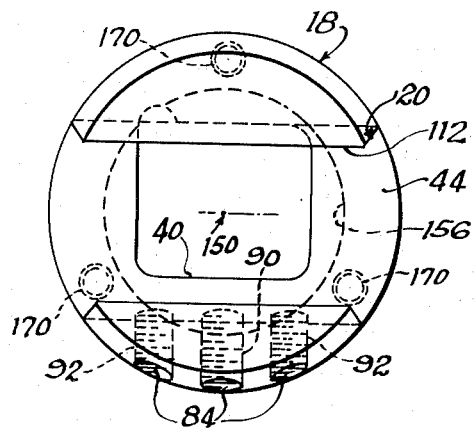
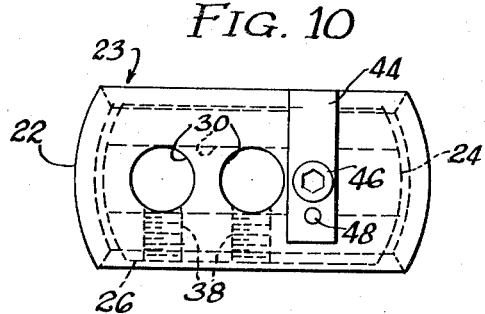
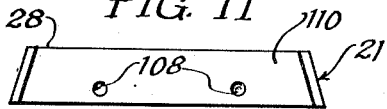
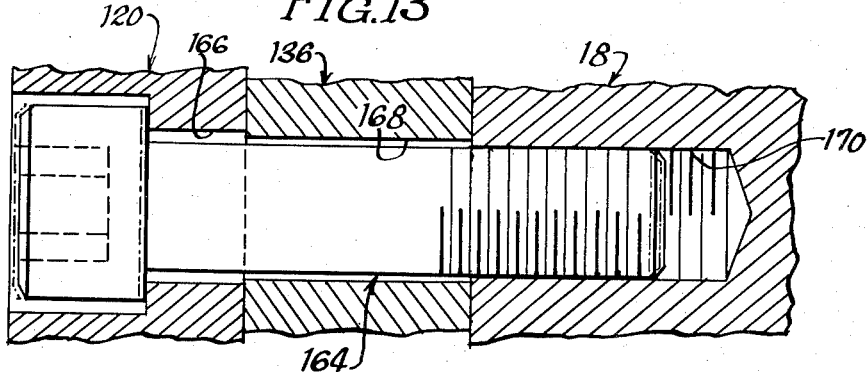
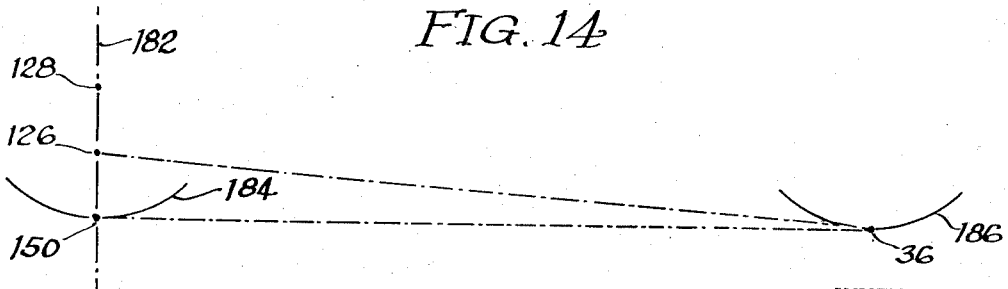
INVENTORS:
Jerry Sainati
Bruno Sainati
Leo Sainati

2,812,672

ADJUSTMENT HEAD FOR BORING BARS

Jerry Sainati, Western Springs, Bruno Sainati, Skokie, and Leo Sainati, Riverside, Ill.

Application April 23, 1954, Serial No. 425,148

19 Claims. (Cl. 77—58)

This invention relates to boring heads.

An object of the invention is to provide a boring head having provision for various degrees of fineness of adjustment of the cutting bit without backlash in the adjusting mechanism or in which error due to backlash is easily avoidable.

Another object is to provide a boring head having a screw adjustment for the diameter of cut, characterized in that the operator in turning the screw is readily cognizant of whether or not he is taking up backlash.

A further object is to provide a boring head in which a boring bar holder engaging gib is held stationary while the bar holder is adjusted.

It is also an object to provide a boring bar holder clamping means including a gib whereby rattling, chatter and maladjustment of the holder due to the boring operation are substantially eliminated or minimized.

An additional object is to provide for adjustment of the cutting bit with a complete absence of backlash.

A further object is to provide a boring head operative to effect relatively rough adjustment of the cutting bit—for example, on the order of one or more thousandths of an inch, using an adjustment screw—supplemented by an accurate and relatively fine backlash-free adjustment of the cutting bit—for example, on the order of one or more ten thousandths of an inch.

Further objects and advantages of the invention will appear as the description proceeds.

The invention will be better understood upon reference to the following description and the accompanying drawings, wherein:

Fig. 1 is an elevational view of a boring head embodying features of the invention.

Fig. 2 is an elevational view taken as indicated by this line 2—2 in Fig. 1.

Fig. 3 is an end sectional view taken as indicated by the line 3—3 in Fig. 1.

Fig. 4 is an exploded longitudinal view, partly in section and partly in elevation, of the head shown in Fig. 1, the boring bar being omitted.

Fig. 5 is a longitudinal sectional view taken as indicated by the line 5—5 in Fig. 2.

Fig. 6 is a view, partly in section and partly in elevation, taken as indicated by the line 6—6 in Fig. 1.

Figs. 7, 8, 9, and 10 are end elevational views taken as indicated by the lines 7—7, 8—8, 9—9, and 10—10, respectively, in Fig. 4.

Fig. 11 is an elevational view of the gib.

Fig. 12 is a top plan view taken as indicated by the line 12—12 in Fig. 2.

Fig. 13 is a magnified view of a part of Fig. 5.

Fig. 14 is an explanatory diagram.

Referring now more particularly to the drawings, there is shown at 16 a boring head constructed in accordance with a preferred form of the invention. It comprises a support 18 having a dovetail slot or keyway 20 for the reception of a gib 21 and the dovetail slide head or key 22 of a holder 23 having a stem 24 formed with a portion 26 overhanging the adjacent edge 28 of the gib, said holder having bores or sockets 30 to selectively receive an end of a boring bar 32 having a cutting bit 34 whose tip is shown at 36, said holder having set screws 38 to firmly secure the bar in the selected socket.

The support 18 has a hole 40 therethrough interrupting the bottom 42 of the dovetail slot 20 for the reception of a traveling nut 44 secured as by a screw 46 and a dowel pin 48 to the wide face 52 of the holder head 22, said nut being engaged with the threaded portion 54 of an adjustment screw 58 chordally mounted in the support so as to extend parallel to the dovetail slot. The screw 58 is journaled as at 60 in and confined to rotary motion relative to the support 18 by reason of engagement of the support 18 at an end of one of the journals by a split ring 62 disposed in and projecting from an annular groove 64 in the screw and at the other end of that journal by the head 66 of the screw. It will accordingly be noted that the nut 44, and with it the holder 23 and boring bar 32 and bit 34, will travel as a unit in one direction or the other, depending on the direction of rotation of the screw 58. Thus the diameter of cut of the bit tip 36 may be adjusted by the screw 58.

The screw head 66 is marked with a circular series of graduations 72 with which a scribe or datum mark 74 on the support 18 cooperates. The graduations 72 may represent any desired degree of such adjustment. For example, a full turn of the adjustment screw 58 may represent a change of .050" in diameter of cut by the tip 36 and thus a turn of the screw from one graduation to the next one would represent a change of .001" in diameter of cut.

The gib 21 is positioned between a cheek 78 of the dovetail slide head 22 and the juxtaposed face 80 of the dovetail slot 20. The support 18 is formed with three parallel tapped holes 84 whose axes are preferably uniformly spaced and co-planar, and transverse to the dovetail slot face 80, with the central hole preferably centrally located relative to said face and containing a set screw 90, and the other holes containing plunger assemblies 92. Each plunger assembly 92 comprises a screw 94 having a pocket 96, a plunger 100 having a pocket 102, and a coil spring 104 is adapted to be received in the pockets and bear against the screw and plunger so as to force them apart and force the plunger against the gib 25 and thereby force the gib against the dovetail cheek 78. The inner end of the plunger 100 is preferably formed with a part-spherical bearing tip 106 engaging in a part-spherical dimple 108 in the outer face 110 of the gib 21 to prevent accidental shift of the gib when the set screw 90 is loose, and to prevent chatter.

When it is desired to adjust the diameter of cut of the tip 36 with the adjustment screw 58, the set screw 90 is first loosened, and then the adjusting screw is turned in the desired direction. If the adjusting screw 58 is turned in the same direction in which it was last turned, there will be no backlash to be taken up, and this will be readily apparent to the operator by reason of the resistance offered by the friction between the dovetail slide head 22 and the gib 21 on one side and the dovetail slot face 112 on the other side, and accordingly he will know that the full amount of turn of the adjustment screw will be effective in shifting the bit holder 28. If the adjustment screw 58 is turned in the direction opposite to that in which it was last turned, the operator will be immediately conscious of that fact since there will be no substantial initial resistance to such turning by reason of the fact that the bit holder 23, and hence the traveling unit 44, will be held stationary by the spring-pressed plungers 100 as aforesaid. He will become immediately conscious of the fact that all of the backlash has been taken up, when that is the case, for then he will meet the resistance offered by the bit holder 23 and traveling nut 44 and the pressure of the plungers 100, and he will then know that the actual adjustment is determined by the degree of turn of the adjustment screw from the position thereof when such resistance is first encountered. After the adjustment is completed in the desired direction, the set screw 90 is tightened. It is accordingly apparent that errors in adjustment due to the presence of backlash are easily avoidable by the operator with the foregoing construction.

A further advantage of this construction resides in the fact that the pressure exerted by the screw 90 at the center of the gib 21 and the pressure exerted by the spring-pressed plungers 100 near the ends of the gib are of a substantial character so that bowing or other flexure or fatigue of the gib resulting from the boring operation, and thus rocking and chattering of the holder 23, are substantially militated against.

In assembling the structure, the gib 21 and holder head 22 are positioned in the slot 20, and then the plunger assemblies 92 are applied. The overhanging portion 26 of the holder 23 prevents the gib 21 from falling out of the slot 20 before the plunger assemblies 92 are applied, in the event that the head 16 is held with the holder lowermost.

Where reliance for adjustment is placed in a screw, the degree of fineness of adjustment is limited since some looseness between the screw and the nut must be present to prevent binding therebetween. In general it is found that, with the use of a screw, an accurate adjustment substantially closer than .001″ in diameter of cut cannot be counted upon.

For the purpose of affording a simple yet accurate fine adjustment of diameter of cut in increments of one or more ten-thousandths of an inch, for example, without backlash, we have devised novel mechanism of which that shown is illustrative. The boring head 16 comprises a rotor shank or body 116 adapted to be held in a chuck or spindle (not shown) and threaded firmly at 118 into a body 120 having a preferably cylindrical eccentric recess 122, the axes of said body and recess being indicated at 126 and 128, respectively. The body 120 is formed with an annular smooth surface 130 outward beyond the recess 122, and has a preferably cylindrical outer periphery 132 bearing circumferentially spaced graduations 134 adjacent said surface.

An adjuster such as the disc 136 of preferably the same outside diameter as the body 120 is formed with a preferably cylindrical boss or lobe 138 journaled in the recess 122, an annular smooth surface 140 complementary to the surface 130 for rotary sliding engagement relative thereto, a preferably cylindrical outer knurled peripheral rib 142 flattened to provide a clear surface 144 bearing a datum or index mark 146 whose proximity to one or another of the graduations 134 gives the operator a reading of the fine adjustment of diameter of cut of the boring tip 36, as will appear. The adjuster 136 at the face thereof opposite the lobe 138 is formed with another preferably cylindrical boss or lobe 148 whose axis 150 is eccentric to the axis 128 of the lobe 138, the adjuster also having a smooth annular surface 152 about the lobe 148.

The boring bar support 18 is formed in the face thereof opposite the dovetail slot 20 with a preferably cylindrical recess 156 in which the adjuster lobe 148 is journaled, the support having a smooth annular surface 160 for rotary sliding engagement with the adjuster surface 152. The plane of the axes of the holes 30 preferably also contains the lobe axis 150, which is also the axis of the support recess 156, and the slot bottom 42 is preferably normal to said axis.

Two or more, preferably three, bolts 164 extending through preferably equally circumferentially spaced bores 166 in the body 120 and preferably arcuate slots 168 in the adjuster 136 and engaged in tapped holes 170 in the support 18 hold the three parts in assembly.

The graduations 134 may be formed at any desired portion of the body periphery 132, with the datum mark 146 at a corresponding part of the adjuster 136. In the illustrated embodiment of the invention, the center (zero) graduation mark 174 is placed in a position corresponding to the zenith of the body recess 122.

For the purpose of illustration, it may be desired to provide for adjustments, both increase and decrease, in increments of .0001″ up to say .0030″, more or less, in diameter of cut. In such event, the distance between consecutive graduation marks 134 may represent .0001″ adjustment in diameter of the circle of the cutting tip 36 of the tool bit 34, as will appear.

In one successful embodiment of the invention, the adjustment screw 58 has a lead of .025″, the graduations 72 accordingly indicating a diameter adjustment of .050″ of the holder 23 (and hence of the cutting tip 36) per revolution of the screw, the eccentricity of the lobe 138 (and hence the body recess 122) relative to the body axis 126 is .0005″, the eccentricity between the lobes 138 and 148 is .0010″, the datum mark 146 on the adjuster 136 is in register with the zero graduation mark 174 on the body 120 when the axes 126, 128, and 150 lie in the same plane 182 (Fig. 8), the adjuster slots 168 are of such length that the adjuster, when the screws 164 are loosened, is rotatable 90° about the lobe axis 128, and the graduations 134 on the body 120 are so spaced that rotation of the adjuster sufficient to move the datum mark 146 through one such space will increase or decrease, as the case may be, the diameter of cut (by the tip 36) by .0001″.

When the adjuster 136 is rotated relative to the body 120, the lobe 148 rotates in an arc orbitally about the lobe axis 128, the radius of the arc being .0010″. The support 22 at the same time also moves orbitally about the lobe axis 128 since it is journaled on the lobe 148, but, by reason of its being journaled, it is retained by the screws 164, confined in the body holes 166, against rotation with the lobe 148. The holes 166 are oversize, preferably not substantially more than is needed to allow the support 22 to execute its said orbital movement. In such movement, the axis 150 shifts relative to the plane 182 in accordance with the law of simple harmonic motion at one side or the other side of said plane, according as the datum mark 146 is at one side or the other side of the zero graduation mark 174. The cutting tip 36, however, being relatively very far removed (say about ½″, more or less, as will appear) from the plane 182, will move orbitally in an arcuate path far removed from said plane, and when the datum mark 146 is at the limit of its rotation relative to the body 120 in the plus direction, the tip will be as far from said plane as it can be moved by the adjuster, and when the datum mark is at its other limit of rotation, the tip will be as close to said plane as it can be moved by the adjuster, the total shift being 2(.0010 sin 45°)″, or .0014″. Since this computed shift is relative to the plane 182, the shift relative to the rotor axis 126 will be slightly different. The error can be readily computed, and will be found to be so extremely slight as to be completely negligible in the premises.

The bit tip shift of .0014″ above noted being in practical effect radial relative to the rotor axis, it follows that the range of diametral adjustment of cut is .0028″. To afford an adjustment of .0001″ in diameter of cut, the adjuster is turned so as to shift the datum mark 146 from one graduation mark 134 to the next in the desired direction, the resulting radial shift of the tip relative to the rotor axis being .00005″, which is one-twentieth of the eccentricity between the axes 128 and 150. With the series of graduation marks arranged in an arc located substantially one and seven-eighths inches from the rotor axis 126, consecutive graduation marks are spaced apart about one-sixteeth of an inch.

In connection with the foregoing, attention is called to the explanatory diagram appearing in Fig. 14, wherein the lobe axis 128, the rotor axis 126, and the lobe axis 150 lie in the same plane 182 which in the illustrated embodiment is the case when the datum mark 146 is in register with the zero graduation 174, as noted above. As also noted above, rotation of the adjuster 136 takes place about the lobe axis 128. It accordingly follows that, pursuant to rotation of the adjuster 136, the lobe axis 150, which is also the axis of the support 18, turns about the lobe axis 128 in an arcuate orbital path, the full range of which is indicated by the arc 184. The tip 36, being held by the set screw 90 in fixed relation to the support 18, moves in a path parallel to the arc 184, the full range of said path being indicated by the arc 186, which, however, is relatively very remote from said axes. In Fig. 14, the spacing shown between the several axes 126, 128, and 150 is of course greatly magnified, whereas, relatively, the distance of the tip 36 from the axes is slightly magnified.

Assume that the operator has a workpiece in which a hole .970" in diameter has been drilled, and he wishes to use a boring head 20 to enlarge the hole to a diameter of 1.0000"—.0002"+.0000". With the workpiece and the boring head 16 set up in a milling machine, boring machine, turret lathe, or the like, so that the rotor axis 126 is alined or substantially alined with the axis of the workpiece hole, the adjuster datum mark 146 in register with the zero graduation mark 174, the screws 164 tight, the set screw 90 loose, and the tip 36 (secured to the boring bar 32 which is in turn secured in the selected hole 30 in the holder 23) in the workpiece hole, the operator slides the holder bodily by hand along the dovetail slot 20 until the tip practically touches the wall of the workpiece hole, moves the boring head so as to withdraw the tip from the hole, rotates the adjusting screw 58 counterclockwise sufficiently to move the tip radially outward sufficiently to increase the diameter of cut by say .005" (indicated by a movement of five graduations 72 past the mark 74), tightens the set screw 90, and makes a cut so as to increase the hole diameter by .005", and repeats such cuts, in various increments, as he selects, until the diameter of the hole as shown by his micrometer is say .9990", plus or minus a few ten-thousandths of an inch. Now the operator loosens the screws 164, turns the adjuster 136 until the datum mark 146 has shifted an amount represented by say five graduation marks 134, tightens the screws 164, takes a cut which increases the workpiece hole diameter to say .9995", and repeats this procedure in smaller amounts of cut, as he selects, until the hole diameter is not less than .9998" nor greater than 1.0000".

The adjuster 136 is preferably formed with sockets 190 to selectively receive a rod (not shown) adapted to be inserted by the operator to facilitate his rotation of the adjuster.

The lobe axes 128 and 150 could be made so as to be disposed at the same side of the rotor axis 126 when the datum mark 146 is in register with the zero graduation mark 174, or the lobe axis 150 could be alined with the rotor axis 126, with satisfactory results.

The eccentricity of the lobe 138 relative to the rotor axis 126 may be varied, as may also the distance between the lobe axes 128 and 150, and the range of rotation of the adjuster 136. Moreover, although we have chosen to locate both lobes 138 and 148 on the adjuster 136, the lobes could be interchanged with the recesses, or the adjuster could be formed with one lobe and one recess and the complemental parts made to correspond.

The graduations 134 may be of progressively increased spacing in each direction from the zero mark 174 to obtain absolute accuracy. With the degree of accuracy required in boring operations, where accuracy to the nearest ten-thousandth of an inch is satisfactory, uniform spacing throughout for the graduations 134 will not introduce appreciable error.

It will be noted from the foregoing that the axis 128 must be eccentric to the rotor axis 126 in order that rotation of the adjuster about the axis 128 can effect adjustment of the distance of the tip 36 from the rotor axis.

The diameter of the body surface 130 is preferably great enough to afford substantial spacing of the graduations 134 so that they may be readily discerned with the naked eye, and in one embodiment of the invention such spacing is about one-sixteenth of an inch, although other spacing may be employed.

Various modifications coming within the spirit of our invention may suggest themselves to those skilled in the art, and hence we do not wish to be limited to the specific forms shown or uses mentioned, except to the extent indicated in the appended claims, which are to be interpreted as broadly as the state of the art will permit.

We claim:

1. A boring head, comprising a rotor, an adjuster journaled to said rotor about an axis parallel to the axis of rotation of the rotor, a support journaled to said adjuster about an axis parallel to the axis of the first journal and eccentrically with respect to said adjuster axis, means confining said support against rotation relative to said rotor while enabling generally radial movement of the support relative thereto, releasable means for securing said rotor, adjuster, and support in fixed relation, a boring bar holder slidably keyed to said support and adapted to support a tool bit offset to the rotor axis in the direction of adjustment of said holder relative to said support, means for adjusting said holder in said direction, and means for securing said holder in fixed relation to said support, the eccentricity of said eccentric journal axes being very small so that rotation of said adjuster provides a fine adjustment, and the sliding adjustment of said holder provides a rough adjustment over the diameter of the bore.

2. A boring head, comprising a support having in one face thereof a dovetail slot, a holder having a hole in which a boring bar is adapted to be secured, said holder having a dovetail end slightly narrower than and disposed in said slot, a gib cooperating with said holder end in substantially filling said slot widthwise, a set screw for clamping said gib and holder in fixed relation to said slot, means for adjusting said holder along said slot when said screw is loose, and spring means biasing said gib against said holder end.

3. A boring head, comprising a support having in one face thereof a dovetail slot, a holder having a hole in which a boring bar is adapted to be secured, said holder having a dovetail end slightly narrower than and in said slot, a gib cooperating with said holder end in substantially filling said slot widthwise, a set screw threading into the central portion of the side of said support defining a side of said slot for clamping said gib and holder in fixed relation to said slot, means for adjusting said holder along said slot when said screw is loose, and a pair of spring pressed means projecting from said support side on opposite sides of said set screw and biased into said gib for preventing movement of said gib with said holder during adjustment of said holder.

4. A boring head, comprising a rotor, a boring bar support, an adjuster journaled to said rotor about an axis parallel to the rotor axis and journaled to said support about an axis parallel and eccentric to the first journal axis, headed screws parallel to said axes and extending through holes in one of said rotor and support and threaded into the other of same, and also extending through circumferential slots in said adjuster, said screws when tight holding said rotor, adjuster, and support rigidly together, said holes being sufficiently oversize and said adjuster slots being of such circumferential extent as to allow said adjuster to turn relative to said rotor about said first mentioned journal axis when said screws are loose, to selectively increase or decrease the distance between the rotor axis and the support journal axis without backlash.

5. The boring head of claim 4 wherein one of said rotor and adjuster has peripheral graduation marks including a designated center mark and the other one of said rotor and adjuster has a datum mark adapted to register selectively with said graduation marks, said datum mark registering with said center mark when said support axis is midway between its minimum and maximum distance from said rotor axis.

6. A boring head, comprising a rotor having a circular eccentric recess whose axis is parallel to the axis of said rotor, a boring bar support having a circular recess facing the first recess, an adjuster having mutually eccentric lobes journaled in the respective recesses, the axes of said lobes being parallel to each other, a boring bar carrying a cutting bit and secured to said support with the eccentricity between the lobe axes minute compared to the distance of the tip of said bit from the axis of the support recess, and means substantially preventing rotation but enabling generally radial movement of said support relative to said rotor while allowing rotation of said adjuster about said rotor recess axis, said means being operative to secure said adjuster and support in fixed relation to said rotor.

7. A boring head, comprising a rotor, a support, an adjuster journaled to said rotor about an axis parallel to the rotor axis and journaled to said support about an axis parallel to and eccentric of said first-mentioned axis, a boring bar carrying a cutting bit and secured to said support with the eccentricity between said journal axes minute compared to the distance of the tip of said bit from the axis of said second journal, and means substantially preventing rotation but enabling generally radial movement of said support relative to said rotor while allowing rotation of said adjuster relative to said rotor about said first journal axis.

8. A boring head, comprising a rotor, a support, an adjuster journaled to said rotor about an axis parallel to the rotor axis and journaled to said support about an axis parallel and eccentric to the first journal axis, a boring bar carrying a cutting bit and secured to said support with the eccentricity between said journal axes minute compared to the distance of the tip of said bit from the axis of said second journal, and means substantially preventing rotation but enabling generally radial movement of said support relative to said rotor while allowing rotation of said adjuster relative to said rotor about said first journal axis, said axes being arranged so that whenever said adjuster is rotated in one direction, said tip will, depending on such direction, approach or recede from said rotor axis, said adjuster and one of said rotor and support having a series of readily discernible uniformly spaced peripheral graduation marks on one of the same and an index mark on the other of same selectively registrable with said graduation marks.

9. A boring head, comprising a rotor, a support, an adjuster journaled to said rotor about an axis parallel and eccentric to the rotor axis and journaled to said support about an axis parallel and eccentric to the first journal axis, a boring bar carrying a cutting bit and secured to said support with the boring bar offset from the rotor axis on a radial line spaced about 90 degrees from a radial plane containing the rotor axis and the eccentric axis of rotation of said adjuster relative to said rotor, and with the eccentricity between said journal axes minute compared to the distance of the tip of said bit from the axis of said second journal, and means substantially preventing rotation while enabling radial movement of said support relative to said rotor and allowing rotation of said adjuster relative to said rotor about said first journal axis, said axes being arranged so that whenever said adjuster is rotated in one direction, said tip will, depending on such direction, approach or recede from said rotor axis.

10. A boring head, comprising a rotor, a support for a boring bar, an adjuster journaled to said rotor about an axis eccentric to the rotor axis, said adjuster being journaled to said support eccentrically to the axis of the first journal, whereby the second journal turns in an orbit about the axis of the first journal in response to rotation of said adjuster about the axis of the first journal, and means cooperating with said rotor and said support for limiting said support to generally radial movement relative to said rotor and for locking said adjuster in its adjusted positions relative to the rotor and support.

11. A boring head, comprising a rotor, a support, an adjuster journaled to said rotor about an axis parallel to the rotor axis and journaled to said support about an axis eccentric and parallel to the first journal axis, a boring bar carrying a cutting bit and secured to said support with the boring bar axis in a plane containing the second journal axis, and with the eccentricity between said journal axes minute compared to the distance of the tip of said bit from the axis of said second journal, and means substantially minimizing rotation while enabling generally radial movement of said support relative to said rotor and allowing substantially greater rotation of said adjuster relative to said rotor about said first journal axis, said axes being arranged so that whenever said adjuster is rotated in one direction, said tip will, depending on such direction, approach or recede from said rotor axis, said adjuster and one of said rotor and support having a series of readily discernible graduation marks on one of the same and an index mark on the other of same selectively registrable with said registration marks, the ratio of the distances of said index mark and the second journal axis from the first journal axis being on the order of at least about 2,000 to 1.

12. A boring-head, comprising a rotor, a boring bar support, an adjuster between and of substantially the same outside diameter as said rotor and support, said adjuster being journaled to said rotor about an axis parallel and eccentric to the rotor axis, said support being journaled to said adjuster about an axis parallel and eccentric to the first journal axis, said boring bar support being adapted to carry a boring bit offset with respect to the rotor axis in radial plane containing the rotor axis and said first-mentioned axis, the distance between said journal axes being twice the distance of the first journal from said rotor axis, said adjuster and one of said rotor and support having on the peripheral surface of one of the same a series of graduation marks including a center mark and an index mark on the other of same selectively registrable with said graduation marks, said index mark registering with center mark when all of said axes lie in the same plane, said graduation marks being so spaced from the first journal axis that to the operator's eye they are readily discernible, each from the adjacent graduation mark, when the space between consecutive graduation marks designates, pursuant to rotation of said adjuster relative to said rotor, a radial shift of the second journal axis relative to said rotor axis through a distance equal to about .0001 inches, and means substantially preventing rotation but enabling radial movement of said boring bar support relative to said rotor while enabling said adjuster to rotate relative to the same and for locking the adjuster into its adjusted positions.

13. An adjusting device free of backlash, said device comprising a body, an adjuster journaled to said body, a member radially adjustable relative to a point on said body spaced from the journal axis, said member being journaled to said adjuster about an axis eccentric with respect to the axis of the first journal, means substantially preventing rotation of said member relative to said body while enabling rotation of said adjuster relative to said body, means limiting rotation of said adjuster relative to said body to an angle not substantially exceeding 90°, releasable means for securing said body, adjuster and member in fixed relation at the desired adjustment of said member relative to said point, one of said body and adjuster having a series of readily discernible uniformly spaced graduation marks and the other one of said body and adjuster having an index mark selectively registrable with said graduation marks, said angle being located between planes which radiate from the first journal axis and define equal angles with a plane which radiates from the first journal axis and contains said point.

14. A boring head, comprising a rotor, a boring bar support, an adjuster journaled to said rotor about an axis parallel to the rotor axis, said support being journaled to said adjuster about an axis parallel and eccentric to the first journal axis, said adjuster and one of said rotor and support having a series of graduation marks on one of the same and an index mark on the other of the same selectively registrable with said gradaution marks, said index mark registering with a predetermined medial graduation mark when all of said axes are coplanar, said graduation marks being so spaced from said first journal axis that to the operator's eye they are readily discernible from adjacent graduation marks, when the space between consecutive graduation marks designates, pursuant to rotation of said adjuster relative to said rotor, a radial shift of the second journal axis relative to said rotor axis through a distance equal to about .0001 inches, and means substantially preventing rotation but enabling radial movement of said boring bar support relative to the same and for locking the adjuster into its adjusted positions.

15. A boring head comprising a rotor, a support for a boring bit which support is mounted for general radial movement relative to said rotor, and an adjuster separately journaled with respect to both said rotor and support so that the adjuster may be rotated relative to both the rotor and holder, said support being carried by the adjuster, the axis of rotation of said adjuster relative to said rotor being parallel to the axis of rotation of said rotor, and the axis of rotation of said adjuster relative to said support being both parallel and eccentric to the axis of rotation of said adjuster relative to said rotor, the radial position of said support relative to the axis of rotation of the rotor varying as the adjuster is rotated relative to said rotor and support, and means substantially preventing said holder from rotating relative to said rotor upon rotary adjustment of said adjuster, and means for locking said adjuster in its adjusted positions.

16. A boring head as recited in claim 15 wherein the axis of rotation of said adjuster relative to said rotor is eccentric to the rotor axis, and said boring bit support is adapted to hold a boring bit offset with respect to the rotor axis in a radial plane spaced about 90° from a radial plane containing the rotor axis and the axis of rotation of said adjuster relative to said rotor.

17. The boring head of claim 16 wherein one of said rotor and support and said adjuster has readily discernible, substantially equally spaced graduation marks and the other of same having an index mark adapted to register selectively with said graduation marks, movement of said index mark from any graduation mark to the next graduation mark effecting the same proportional extent of radial recessation or approach, as the case may be, of said support journal axis relative to said rotor axis regardless of which two consecutive graduation marks are involved.

18. The boring head as recited in claim 15 wherein said adjuster is located between said rotor and boring bit support, the journal connection between said adjuster and rotor being a cylindrical lobe on one of the same and a complementary cylindrical recess in the other of same, and the journal connection between said adjuster and said tool bit support being a cylindrical lobe on one of the same and a complementary cylindrical recess on the other of same.

19. The boring head of claim 15 wherein there is provided a boring bar holder slidably keyed to said support along a radial axis which is parallel to the direction of radial shift of said support relative to said rotor upon rotation of said adjuster, calibrated means for progressively varying the position of said boring bar holder relative to said support to provide a rough adjustment over the diameter of the bore to be cut by a tool bit supported by said boring bar holder, one of said rotor and support and said adjuster having peripheral graduation marks including a designated center mark thereon and the other of same having an index mark adapted to register selectively with said graduation marks, said index being positioned opposite said center mark during adjustment of said boring bar holder relative to said support, and the eccentricity of the axis of rotation of said adjuster relative to said support being minute so that a fine adjustment over the radial shift of said support is effected upon rotation of said adjuster.

References Cited in the file of this patent

UNITED STATES PATENTS

| | | |
|---|---|---|
| 1,051,531 | Whipple | Jan. 28, 1913 |
| 2,211,596 | Darash | Aug. 13, 1940 |
| 2,305,737 | Richards | Dec. 22, 1942 |